United States Patent [19]

McCown et al.

[11] 3,950,298
[45] Apr. 13, 1976

[54] FLUOROALIPHATIC TERPOLYMERS

[75] Inventors: Joseph D. McCown, Maplewood; Myron T. Pike, Stillwater, both of Minn.

[73] Assignee: Minnesota Mining and Manufacturing Company, St. Paul, Minn.

[22] Filed: Sept. 3, 1974

[21] Appl. No.: 502,749

[52] U.S. Cl........ 260/33.6 F; 260/80.73; 260/80.76; 260/468 L
[51] Int. Cl.$^2$.............C08F 214/18; C08F 216/18; C08F 226/02; C08K 5/01
[58] Field of Search......... 260/80.76, 80.73, 89.5 R, 260/468 L, 33.6 F

[56] References Cited
UNITED STATES PATENTS

| | | |
|---|---|---|
| 2,991,277 | 7/1961 | Schildknecht................. 260/80.76 |
| 3,256,230 | 3/1966 | Johnson et al................... 260/29.6 |
| 3,329,661 | 7/1967 | Smith et al....................... 260/29.6 |
| 3,625,929 | 12/1971 | Stump et al...................... 260/89.5 |
| 3,654,244 | 4/1972 | Pittman et al. ................ 260/80.76 |

*Primary Examiner*—Donald E. Czaja
*Assistant Examiner*—H. H. Fletcher
*Attorney, Agent, or Firm*—Alexander, Sell, Steldt & DeLaHunt

[57] ABSTRACT

Terpolymers of N-alkyl perfluoroalkanesulfonamidoalkyl (meth)acrylate, higher alkyl (meth)acrylate and polyoxyalkylene glycol mono- to bis-(meth)acrylates in a prescribed range of concentrations provide useful solubilities in organic solvents including aliphatic, cycloaliphatic and aromatic hydrocarbons with minimal formation of foams. Textiles and surfaces coated with the terpolymers show desirable oleophobicity.

6 Claims, No Drawings

FLUOROALIPHATIC TERPOLYMERS

This ivention relates to thermoplastic terpolymers of fluoroaliphatic vinyl monomer, higher aliphatic hydrocarbyl vinyl monomer and polyoxyalkylene mono- or di- vinyl monomer and particularly to terpolymers of N-alkyl perfluoroalkanesulfonamidoethyl (meth)acrylate, $C_8$ to $C_{20}$ alkyl (meth)acrylate and polytetramethylene glycol mono- to bis-(meth)acrylate. The term (meth)acrylate is employed to indicate the alternatives of acrylate and methacrylate.

The desirable properties conferred on surfaces by oleophobic polymeric fluorinated coatings are usually obtained only when highly fluorinated groups, i.e., fluoroaliphatic groups, are present in sufficient amount to give a rather high percentage of fluorine in the coating, of the order of 30 to 50 percent fluorine in many cases. Such high fluorine contents tend to make the polymeric materials substantially insoluble in most organic solvents so that coating from solution in readily available inexpensive nonhalogenated solvents is not possible and emulsions or latices in water are used. In some cases, in which useful fluoroaliphatic group-containing polymers possess significantly solubility in ordinary halogen-free solvents, the solutions foam excessively and the foam may be persistent. This foaming tends to preclude application of the polymers from hydrocarbon solvents. Further polymers having useful solubility characteristics generally lack sufficient repellency to oil and water. In any event, fluoroaliphatic polymers having solubility in volatile halogen-free organic solvents such as lower hydrocarbons, ketones, etc., without persistent foaming are desirable because of the convenience of using such solutions for application to textiles as well as to other surfaces such as glass, ceramic; metal, plastic, etc.

It is a principal aim and object of this invention to provide fluoroaliphatic group-containing polymers having useful solubilities in halogen-free solvents without excessive foaming and providing useful degrees of oleophobicity in coatings deposited thereon. Other objects will be evident hereinelsewhere.

It is found that terpolymers prepared using fluoroaliphatic vinyl monomer, higher aliphatic hydrocarbyl vinyl monomer and polyoxyalkylene mono- to di- vinyl monomer and preferably:

1. 20 to 50 percent of fluoroaliphatic vinyl monomer, e.g., N-methyl perfluorooctanesulfonamidoethyl acrylate,
2. 25 to 60 percent hydrocarbyl higher (e.g., $C_8$ to $C_{20}$) alkyl vinyl monomer, e.g., stearyl methacrylate,
3. 10 to 20 percent polytetramethylene glycol mono- to di- vinyl monomer, e.g., methacrylate to dimethacrylate, preferably of M.W. of glycol about 1500 to 2500 and limited in molecular weight provide oil and water repellency to surfaces. At least the preferred ranges of the polymers are soluble in methyl isobutyl ketone and to at least about 0.5 percent at $-25°$ C. and at least 5 percent and preferably 10% at $+25°$ C. in hydrocarbon mixture made up of 10 percent by volume xylene, 20 percent toluene, 10 percent hexanes and 60 percent isooctane. Small residues which may be noted in solutions are due primarily to adventitious crosslinking. The terpolymers (in the form of coatings) provide oil repellency such that the average of the initial angles of contact therewith of n-dodecane and toluene is about $65°$ or more. The foam test is run by shaking 15 g. of 0.01 percent solution in a $24 \times 95$ mm. vial vigorously for 10 seconds. The test for foaming is passed if the foam height of a 0.01 percent by weight solution in the hydrocarbon mixture described above within 2 minutes after shaking is negligible, that is, about ½ mm. or less and preferably is no more than about 5 mm. immediately after shaking. The low foaming appears to result from the inclusion of polyoxyalkylene (meth)acrylates.

If at least 15 percent of polyoxyalkylene (e.g., polyoxytetramethylene) (meth)acrylate is not included, copolymers of the same fluorine content are obtained which tend to have poor foaming properties and lower, i.e., less satisfactory, oil repellency. Sherman and Smith, U.S. Pat. No. 3,341,497 describe some such copolymers in their examples.

As stated above, terpolymers of the invention are derived from fluoroaliphatic radical-containing vinyl monomer, such as an acrylate or methacrylate. Suitable monomers are available, for example, among the many described in the patents listed in Table 1. Generically, such monomers are termed fluoroaliphatic vinyl monomers, fluoroaliphatic acrylates or fluoroaliphatic acrylates or methacrylates. It is essential that the monomer contain a fluoroaliphatic radical terminating in a $CF_3$ group. The fluoroaliphatic radical should contain at least three fully fluorinated carbon atoms which may or may not contain the terminal $CF_3$. A perfluoroalkyl group, $C_nF_{2n+1}$, is preferred wherein $n$ is 3 to 20. The monomer should contain at least 25 percent by weight of fluorine in the form of fluoroaliphatic radical and preferably at least 30 percent and up to as much as 60 percent, generally about 50 percent. The fluoroaliphatic-radical containing monomer provides oil repellency in air and assists in stain and soil release during laundering.

The fluoroaliphatic radical is a fluorinated, saturated, monovalent, non-aromatic aliphatic radical of at least 3 carbon atoms. The chain may be straight, branched, or if sufficiently large, cyclic, and may be interrupted by divalent oxygen atoms or trivalent nitrogen atoms bonded only to carbon atoms. Preferably the chain of the fluoroaliphatic radical does not contain more than one nitrogen atom for every two carbon atoms in the skeletal chain. A fully fluorinated group devoid of hydrogen atoms is preferred, but hydrogen or chlorine atoms may be present as substituents in the fluorinated aliphatic radical provided that not more than one atom of either is present in the radical for every two carbon atoms, and that the radical must at least contain a terminal perfluoromethyl group. "Terminal" in this connection refers to the position in the skeletal chain of the radical which is furthest removed from the backbone chain of the segment. Preferably the fluoroaliphatic radical contains not more than 20 carbon atoms because such a large radical results in inefficient use of the fluorine content.

Table 1

| Inventors | U.S. Pat. No. | Title |
|---|---|---|
| Ahlbrecht, | | |

Table 1-continued

| Inventors | U.S. Pat. No. | Title |
|---|---|---|
| Reid and Husted | 2,642,416 | Fluorinated Acrylates & Polymers |
| Ahlbrecht, Brown & Smith | 2,803,615 | Fluorocarbon Acrylate & Methacrylate Esters & Polymers |
| Bovey & Abere | 2,826,564 | Fluorinated Acrylate & Polymers |
| Ahlbrecht & Smith | 3,102,103 | Perfluoroalkyl Acrylate Polymers & Process of Producing a Latex thereof |
| Johnson & Raynolds | 3,256,230 | Polymeric Water & Oil Repellents |
| Johnson & Raynolds | 3,256,231 | Polymeric Water & Oil Repellents |
| Fasick & Raynolds | 3,282,905 | Fluorine Containing Esters & Polymers thereof |
| Smith & Sherman | 3,329,661 | Compositions and Treated Articles thereof |
| Smith & Sherman | 3,356,628 | Copolymers of Perfluoro Acrylate Hydroxy Alkyl Acrylates |
| Farah & Gilbert | 3,407,183 | Acrylate & Methacrylate Esters and Polymers thereof |
| Kleiner | 3,412,179 | Polymers of Acrylyl Perfluorohydroxamates |
| Pacini | 3,445,491 | Perfluoroalkylamido-alkylthio Methacrylates and Acrylates & Intermediates therefor |
| Eygen & Carpentier | 3,470,124 | New Fluorinated Compounds & Their Preparation |
| Brace | 3,544,537 | Poly(perfluoroalkoxy)-polyfluoroalkylacrylate-type Esters & Their Polymers |
| Caporiccio & Strepparola | 3,814,741 | Acrylic and Methacrylic Monomers, Polymers & Copolymers |

More particularly, fluoroaliphatic radical-containing acrylate monomers illustrative of those described in the patents of Table 1 include:

$(C_3F_7)_3CCH_2O_2CCH=CH_2$
$C_3F_7SO_2N(C_3H_7)C_2H_4O_2CC(CH_3)=CH_2$
$C_8F_{17}(CH_2)_3O_2CCH=CH_2$
$C_8F_{17}COCH_2CH_2CH_2O_2CCH=CH_2$
$C_8F_{17}(CH_2)_{11}O_2CC(CH_3)=CH_2$
$C_8F_{17}SO_2CH_2CH_2O_2CCH=CH_2$
$C_8F_{17}SOCH_2CH_2O_2CCH=CH_2$
$C_8F_{17}SO_2N(C_2H_5)(CH_2)_2O_2CC(CH_3)=CH_2$
$C_{12}F_{25}SO_2NH(CH_2)_{11}O_2CC(CH_3)=CH_2$
$CF_3C(CF_2H)F(CF_2)_{10}CH_2O_2CCH=CH_2$
$CF_3C(CF_2Cl)F(CF_2)_{10}(CH_2)_2O_2CCH=CH_2$
$C_8F_{17}SO_2N(CH_3)CH_2O_2CC(CH_3)=CH_2$
$C_2F_5(OCF_2CF_2)_6OCF_2CF_2CON(CH_3)CH_2CH_2O_2CCH=CH_2$
$(C_4F_9CO)_2NCH_2CH_2O_2CC(CH_3)=CH_2$

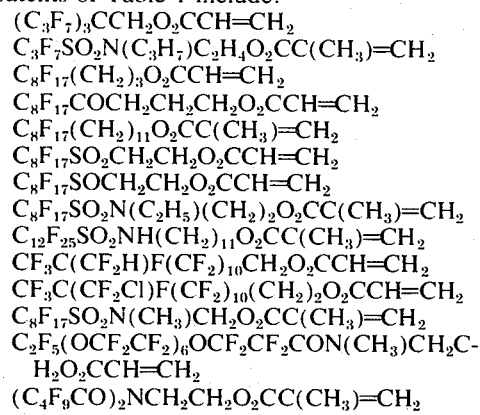

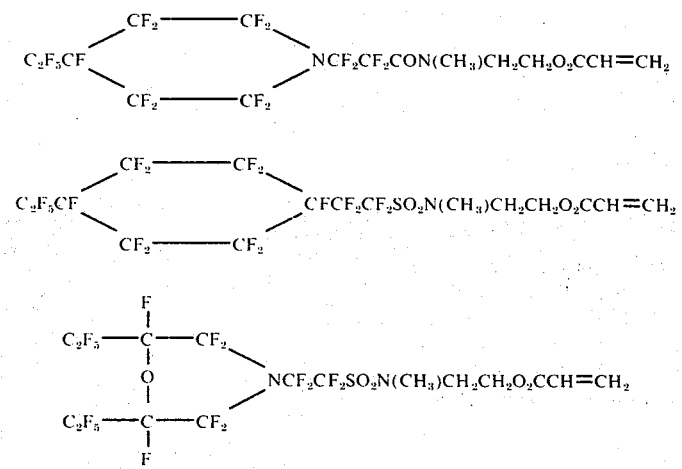

The above and their equivalents can be employed to produce terpolymers as described herein.

The second component in the terpolymers of the invention is a higher aliphatic hydrocarbyl vinyl monomer, preferably a higher alkyl acrylate or methacrylate, $C_mH_{2m+1}O_2CC(X)=CH_2$ where $m$ is 8 to 20 and X is H or $CH_3$, used in an amount of 25–60 by weight of the monomer mixture. A particularly convenient component is found to be commercially available stearyl methacrylate in which the stearyl group is a mixture of higher alkyl groups in which $C_{18}H_{37}$ predominates.

The third component needed for terpolymers of the invention is a polyoxypropylene or preferably polyoxytetramethylene acrylate or methacrylate. This component in combination with the above higher aliphatic hydrocarbyl acrylate or methacrylate provides a balance of properties in the polymer which minimizes foaming tendencies.

The polyoxytetramethylene diol average molecular weight can vary from about 750 to about 4,000 but is preferably about 1500 to 2500. The material available commercially as Polymeg 2,000 (tradename product of the Quaker Oats Company) is suitable. Esterification of from 50 to 90 percent and preferably about 75 percent with acrylic or methacrylic acid by essentially conventional procedures provides a useful acrylate component. It is advantageous to stop the esterification at an intermediate stage to avoid formation of too much bis ester. This component of the copolymer of the invention is generally a mixture of the diol, mono and diesters and can be represented on the average by the general formula

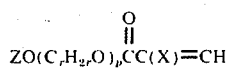

wherein $r$ is 3 or 4, X if H or $CH_3$, $p$ is about 10 to about 35, and Z is H or

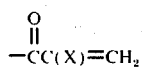

The following brief description illustrates the general procedure used for preparing this component: 260 parts of commercial Polymeg 2,000 is placed in a vessel with 221 parts of toluene and to it are added 0.25 parts hydroquinone monomethyl ether, 0.13 parts of phenothiazine, 22.1 parts of methacrylic acid and 2.6 parts of toluene sulfonic acid. Refluxing of the mixture is continued until an aliquot is shown by titration to contain 0.15 to 0.16 milliequivalents of acid per gram. The mixture is cooled and 2.2 parts of calcium hydroxide added. Agitation is continued for about one half hour and the mixture is then filtered (using filter aid if needed) to remove precipitates. Solvent is then removed under reduced pressure and the residual ester containing phenothiazone and hydroquinone methyl ether is recovered. The degree of esterification is calculated by dividing the saponification equivalent of the isolated product by the hydroxyl equivalent weight of the starting diol. Because of incidental cleavage in relatively minor amounts of the polyoxytetramethylene chain during processing, the actual degree of esterification is believed to be somewhat less than is calculated by this procedure.

The terpolymer of the invention is obtained by polymerization procedures. Solvent polymerization has been found most useful. Any of the conventional neutral solvents are suitable, such as toluene, xylene, methylisobutylketone, ethyl acetate, 1,1,1-trichloroethane and the like.

Any conventional free-radical catalysts which are soluble in the solvent system can be used. Particularly preferred are azo compounds such as azobisisobutyronitrile and peroxides such as t-butyl hydroperoxide. Catalyst concentration is suitably 0.1 to 2 percent of the charge. A similar terpolymer is found to have a number average molecular weight of about 40,000.

Conventional chain transfer agents, such as octyl mercaptan, can be used in amounts of 0.1 to 2 percent, preferably about 1.2 to 1.5 percent by the weight of monomer to control the molecular weight of the polymer product. This is particularly desirable when a significant amount of diacrylate is present in the formulation, i.e., when the diol moieties average over 50 percent esterification. Lower amounts are used when there is a low degree of esterification of the monomers.

Total polymer solids as high as 50 percent or more can be obtained in the reaction mixture, although solids contents of 10–40 percent are usually of more suitable viscosity.

The product terpolymer of the invention can be converted to an aqueous latex, for example, by polymerization in a water-miscible solvent followed by mixing the solution with water under strong agitation or high shear or by polymerization in aqueous suspension. Usually, the addition to the water of 0.5–5 percent of an emulsifier is desirable. Exemplary emulsifiers include polyoxyethylated alkyl phenol, quaternary alkyl ammonium salts, fluoroaliphatic sulfonates, or mixtures thereof. If desired, a water immiscible solvent such as ethyl acetate can be used and subsequently be removed from the mechanically formed latex by volatilization.

The product terpolymer, in the form of a solution or latex, can be applied to fabric by conventional means, such as spray, pad, or roll-coater to provide a treated fabric which, after drying, has resistance to oily or aqueous stains.

Standard tests are employed in the evaluation of treated fabrics. The standard tests are provided by the American Association of Textile Chemists and Colorists (AATCC) Technical Manual available from the Association office, P.O. Box 72215, Research Triangle Park, N.C. 27709. The following tests from the 1970 Manual are employed herein:

| | |
|---|---|
| Oil Rating | Test No. 118–66 |
| Water Repellency | Test No. 22–67 |

Now, having described the invention broadly, it is more specifically illustrated by examples showing how the invention is practiced and the best mode presently contemplated for practicing the invention.

EXAMPLE 1

The following shows the solvent polymerization to yield polymers of the invention from which those skilled in the art will readily perceive variations by which other equivalent polymers are made.

A bottle of about 500 ml. capacity is charged with:
80.0 g. N-methyl perfluorooctanesulfonamidoethyl acrylate
80.0 g. stearyl methacrylate (commercially available from Rohm and Haas, stearyl comprises at least 82 percent $C_{16}$ and $C_{18}$ and the balance is lower and higher homologs)
40.0 g. methacrylic acid esterified polyoxytetramethylene glycol (MW ca. 2000)
157 g. methyl isobutyl ketone
0.50 g. azobisisobutyronitrile
2.70 g. n-octyl mercaptan The bottle is flushed with oxygen-free nitrogen, sealed and rotated for 16 hours in a water bath at 65°C. to permit polymerization. The solution contains 56.5 percent solids.

Portions of the solution are diluted in the above hydrocarbon mixture to 500 parts per million solids (0.05 percent by weight) and 250 parts per million (0.025 percent). Solutions of concentrations of at least 5 percent can be made if desired at room temperature. Small strips or coupons of stainless steel are thoroughly cleaned and suspended in the respective diluted solutions for two minutes, removed, air dried and heated at 70° C. for 1 hour. Contact angles of n-hexadecane and mineral oil on the coated strips are measured to be as follows:

| Concentration of Polymer | n-$C_{16}H_{34}$ | Mineral Oil |
|---|---|---|
| 0.05% | 58° | 74° |
| 0.025% | 24° | 50° |

A similar terpolymer is prepared and coated by the above method from a solution containing 2.0 percent solids in methyl isobutyl ketone. The contact angles of dodecane and toluene against the coated strips are found to be 82° and 109° respectively initially and of toluene 100° after 1 minute. A 0.01 percent solution of the terpolymer in the above hydrocarbon mixture gave about 6 mm. foam when initially shaken which rapidly disappeared within about a minute to being negligible (½ mm. or less). When 1.0 percent solution in hydrocarbon mixture of the above polymers are chilled to −25° C, only slight residues are obtained. Oil repellent films can be obtained even from solutions containing 5 parts per million (0.0005 percent) of copolymers of the invention.

EXAMPLES 2–6

In the above example, the fluoroaliphatic (meth)acrylate, higher alkyl (meth)acrylate and polyoxytetramethylene glycol (meth)acrylate are in the proportion of 40:40:20. Substantially equally useful other materials are prepared using ratios of the same monomers of 45:40:15, 50:30:20, 35:45:20, 25:55:20 and 20:60:20. These are found to show good solubility in methyl isobutyl ketone and solubility to at least 0.5 percent at −25°C. in the above-described hydrocarbon mixture. In many cases, small amounts of cross-linked material may be present as a residue but the polymer as a whole is soluble. Further, these terpolymers are applied to stainless steel coupons from 2 percent by weight solutions in methyl isobutyl ketone as described above and contact angles of dodecane and toluene measured thereagainst. The sums of initial reading in every case is 130° or more, that is, the average of the two values is over 65 and in almost every case the same is true after 1 minute. It is found that the contact angle of toluene tends to decrease within a short time and sometimes falls by as much as 20°–30°. It is also found that the polymers all pass the foaming test of shaking a 0.01 percent solution as described above in mixed aromatic aliphatic hydrocarbons (10 percent xylene, 20 percent toluene, 10 percent hexanes, 60 percent isooctane) and measuring the foam height immediately and at 1 and 2 minutes by showing foam heights of less than ½ mm. at least after 2 minutes.

EXAMPLE 7

Variations in the amount of octyl mercaptan used over the range of 1.08 to 1.83 percent of the total weight of monomers give useful products having proportions within acceptable ranges as does varying the amount of azobisisobutyronitrile at least over the range of 0.1 to 1.0 percent of the total weight of monomers.

EXAMPLE 8–11

Terpolymers in which proportions are 15:63:22, 25:50:25, 60:15:25, 70:25:5 are found to be less satisfactory with respect to one or more of the necessary criteria or to gel.

EXAMPLE 12

It is also possible to prepare polymers of the invention as latices. An approximately 115 ml. (4 oz.) bottle is charged with:

8.0 g. N-methyl perfluorooctanesulfonamidoethyl acrylate,
 8.0 g. stearyl methacrylate,
 4.0 g. polyoxytetramethylene glycol mono- and dimethacrylate,
 0.26 g. t-dodecyl mercaptan,
 1.0 g. (Ethoquad 18/25; a quaternized bis(polyoxyethylene)stearyl amine),
 0.08 g. potassium persulfate,
 37.7 g. distilled water,
 9.3 g. acetone.

The bottle is flushed with oxygen-free nitrogen, sealed and rotated for 16 hours in a water bath at 80° C. to effect polymerization. The polymer latex is cooled to about 20° C. and filtered to give a latex containing about 25 percent solids containing about 20 percent fluorine.

A pad bath is prepared by dilution of the above latex to 0.6 percent solids by adding water and 0.8 percent conventional aminoplast resin (Permafresh Resin 182 from Sun Chemical Co.) and 1.0 percent zinc nitrate catalyst (Catalyst X-4, of the same firm). A pad bath for comparison purposes using a latex of (about 50 percent fluorine content) 95/5 N-methylperfluorooctanesulfonamidoethyl acrylate/butyl acrylate diluted in the same way. The respective baths are padded on a nylon fabric (A), polyester fabric (B) and different polyester fabric (C) passing through squeeze rollers to give 50 percent wet pickup for (A) and (B) and 90 percent for (C). The swatches are heated at 150° C. for 5 minutes and rated for oil and water repellency by the standard American Association of Textile Chemists and Colorists Tests noted hereinabove. Each of the control swatches has an oil rating of 6 and spray rating of 100 for swatches A and B and 90 for swatch C. Swatches treated with the above polymer of the invention gave oil ratings of 7 and spray ratings of 100. This result is considered surprising in view of the lower amount of fluorine in the polymers of the invention (20 percent) and the low amount of fluorine on the fabric (0.067 percent for A and B and 0.09 for C) as compared to 50 percent fluorine in the control polymer treatment, 0.15 percent on fabric for A and B and 0.24 for C.

The polymer made above in solution (Example 1; 40:40:20 ratio also containing about 20% fluorine) is applied from 0.6 percent solids solution in methyl isobutyl ketone (without wash and wear resin or catalyst) at the same levels as above so that the fluorine content of fabric is 0.06 percent for A and B and 0.09 percent for C. Oil ratings are 5⁺, 5 and 6 and spray ratings 90, 75 and 80 respectively for treated swatches of A, B and C. It is usually expected that a polymer containing 50 percent fluorine when applied at these levels will give a spray rating of about 80 and oil ratings of 5 to 6. These polymers of the invention thus provide equivalent oil and water repellency at a lower fluorine level. It will be obvious that the lower level of fluorine will result in economics to the consumer.

When other polymers of the invention prepared in solution are applied to fabrics by padding solutions followed by drying, it is found that the fabrics are rendered oil and water repellent. It is also found that polymers of the invention can be applied using hydrocarbon solvents, such as Stoddard solvent, and that fabrics and other substrates are rendered oil and water repellent.

What is claimed is:

1. Hydrocarbon-soluble, low-foaming, low surface energy, oil and water repellent thermoplastic terpolymer of monomers
   A. fluoroaliphatic vinyl monomer containing at least 25 percent of fluorine in the form of fluoroaliphatic radicals terminating in $CF_3$ groups and containing in their chain a total of at least three fully fluorinated carbon atoms and not more than one atom of hydrogen or chlorine for every two carbon atoms of said chain,
   B. higher aliphatic hydrocarbyl vinyl monomer containing higher aliphatic hydrocarbyl groups of 8 to 20 carbon atoms, and
   C. mono- to di-acrylate or methacrylate of polyoxytetramethylene diol of molecular weight from about 750 to about 4000.

2. Hydrocarbon-soluble, low-foaming, low surface energy oil and water repellent thermoplastic terpolymer of monomers:
   A. fluoroaliphatic acrylate or methacrylate containing at least 25 percent fluorine in the form of fluoroaliphatic radicals terminating in $CF_3$ groups and containing in their chains a total of at least three fully fluorinated carbon atoms and not more than one atom of hydrogen or chlorine for every two carbon atoms of said chain,
   B. higher aliphatic hydrocarbyl acrylate or methacrylate containing higher aliphatic hydrocarbyl groups of 8 to 20 carbon atoms, and
   C. mono- to di-acrylate or methacrylate of polyoxytetramethylene diol of molecular weight of about 750 to about 4000.

3. A terpolymer according to claim 2 from monomers:
   A. 20 to 50 percent fluoroaliphatic acrylate or methacrylate,
   B. 25 to 60 percent higher aliphatic hydrocarbyl acrylate or methacrylate, and
   C. 15 to 20 percent mono- to di-methacrylate or acrylate of polyoxytetramethylene diol of average molecular weight from about 750 to about 4000.

4. A terpolymer according to claim 3 wherein monomer A is N-methyl perfluorooctanesulfonamidoethyl acrylate and monomer B is stearyl methacrylate and C is mono- to di-methacrylate of polyoxytetramethylene diol of molecular weight from about 1500 to about 2500.

5. Hydrocarbon solution of low-forming, low surface energy, oil and water repellent thermoplastic terpolymer of monomers:
   A. 20 to 25 percent fluoroaliphatic acrylate or methacrylate containing at least 25 percent fluorine in the form of fluoroaliphatic radicals terminating in $CF_3$ groups and containing in their chains a total of at least three fully fluorinated carbon atoms and not more than one atom of hydrogen or chlorine for every two carbon atoms of said chain,
   B. 25 to 60 percent aliphatic hydrocarbyl acrylate or methacrylate containing higher aliphatic hydrocarbyl groups of 8 to 20 carbon atoms, and
   C. 15 to 20 percent mono- to di-acrylate or methacrylate of polyoxytetramethylene diol of molecular weight from about 750 to 4000.

6. Hydrocarbon solution according to claim 5 wherein the terpolymer includes mono- to di-methacrylate of polyoxytetramethylene glycol of molecular weight from about 1500 to about 2500.

* * * * *

UNITED STATES PATENT AND TRADEMARK OFFICE
CERTIFICATE OF CORRECTION

PATENT NO. : 3,950,298
DATED : April 13, 1976
INVENTOR(S) : Joseph D. McCown and Myron T. Pike It is certified that error appears in the above-identified patent and that said Letters Patent are hereby corrected as shown below:

Column 1, line 37, ";" (semicolon) should read as -- , -- (comma).

Column 8, line 59, -- each -- should be inserted between "80" and "respectively."

Column 8, line 66, "economics" should read as -- economies -- .

Column 10, line 18, "low-forming" should read as -- low-foaming -- .

Column 10, line 21, "25" should read -- 50 -- .

*Signed and Sealed this*

*Twenty-seventh* Day of *June 1978*

[SEAL]

*Attest:*

RUTH C. MASON
*Attesting Officer*

DONALD W. BANNER
*Commissioner of Patents and Trademarks*